(12) United States Patent
Kim et al.

(10) Patent No.: US 12,360,208 B2
(45) Date of Patent: Jul. 15, 2025

(54) FOREIGN SUBSTANCE DETECTION SYSTEM

(71) Applicants: HYUNDAI MOTOR COMPANY, Seoul (KR); KIA CORPORATION, Seoul (KR)

(72) Inventors: Je Yeon Kim, Yangsan-si (KR); Hae Jun Jeong, Siheung-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 283 days.

(21) Appl. No.: 17/983,085

(22) Filed: Nov. 8, 2022

(65) Prior Publication Data
US 2023/0176182 A1 Jun. 8, 2023

(30) Foreign Application Priority Data
Dec. 7, 2021 (KR) .................. 10-2021-0173861

(51) Int. Cl.
| | | |
|---|---|---|
| *G01S 7/40* | (2006.01) | |
| *B60S 1/08* | (2006.01) | |
| *B60S 1/46* | (2006.01) | |
| *B60S 1/54* | (2006.01) | |
| *G01S 13/931* | (2020.01) | |

(52) U.S. Cl.
CPC .............. *G01S 7/40* (2013.01); *B60S 1/0818* (2013.01); *B60S 1/46* (2013.01); *B60S 1/54* (2013.01); *G01S 13/931* (2013.01)

(58) Field of Classification Search
CPC ........ B60S 1/0851; B60S 1/0818; B60S 1/46; B60S 1/54; B60S 1/56; B60S 1/485; B60S 1/603; G01S 7/40; G01S 13/931; G01S 7/4043; G01V 9/00; B60R 11/02; B60R 16/03
See application file for complete search history.

(56) References Cited

U.S. PATENT DOCUMENTS

| | | | |
|---|---|---|---|
| 4,805,070 A * | 2/1989 | Koontz | B60S 1/0822 361/286 |
| 2015/0090291 A1 | 4/2015 | Na et al. | |
| 2018/0068552 A1* | 3/2018 | Alarcon | G08B 21/182 |

FOREIGN PATENT DOCUMENTS

KR 20150035204 A 4/2015

* cited by examiner

*Primary Examiner* — Timothy P Graves
(74) *Attorney, Agent, or Firm* — Lempia Summerfield Katz LLC

(57) ABSTRACT

A foreign substance detection system is disclosed to detect whether foreign substances are attached to an environmental sensor of a vehicle. The foreign substance detection system includes a detection loop through which current selectively flows. In particular, the detection loop includes a controller configured to operatively control a sensor cleaning system configured to clean an environmental sensor of a vehicle, and a power supply unit configured to continuously supply electric power to the controller. The environmental sensor includes a detection device configured to open or close the detection loop on the basis of whether a fluid or a foreign substance is attached.

18 Claims, 7 Drawing Sheets

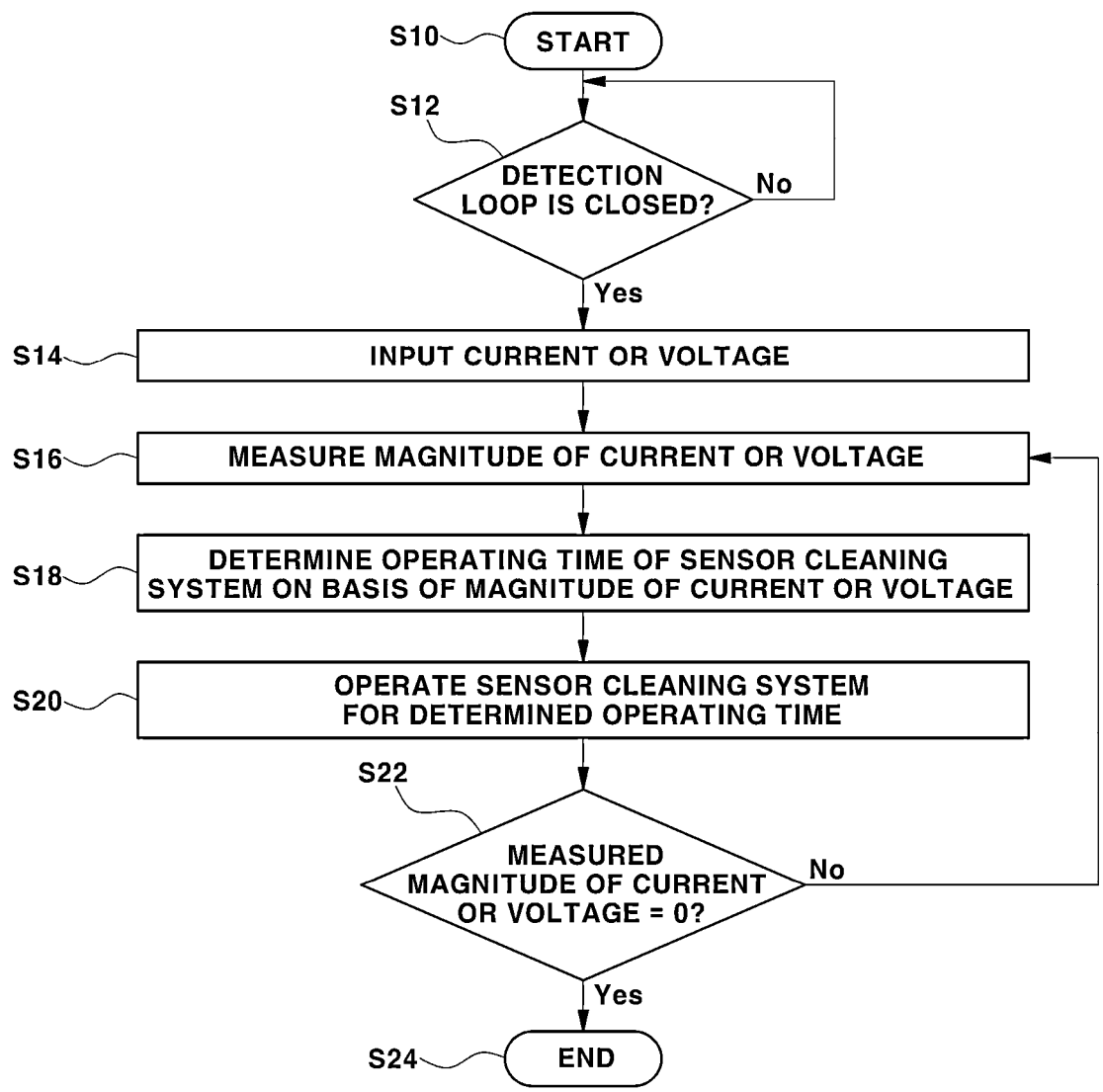

FOREIGN SUBSTANCE DETECTION SYSTEM

CROSS-REFERENCE TO RELATED APPLICATION

This application claims under 35 U.S.C. § 119(a) the benefit of and priority to Korean Patent Application No. 10-2021-0173861, filed on Dec. 7, 2021, the entire contents of which are incorporated herein by reference.

BACKGROUND

(a) Technical Field

The present disclosure relates to a detection system for detecting foreign substances, and more particularly a foreign substance detection system for a vehicle.

(b) Background Art

Recently, driver assistance systems for assisting drivers in vehicles are mounted in the vehicles to ensure safe driving in various traveling situations. Further, research and development are being actively conducted on autonomous vehicles that may autonomously travel without a driver's intervention in addition to research and development on the driver assist systems.

Various types of environmental sensors capable of detecting surrounding environments in various ways need to be installed in the driver assistance system or the autonomous vehicle. Examples of the environmental sensor mounted in the vehicle may include a radar, a lidar, a camera, and the like.

Because these sensors are mounted outside the vehicle, sensing parts of the sensors may be easily contaminated by raindrops, snow, and foreign substances, such as dust. These sensors are desired to be kept clean at a certain level or higher to maintain sensor performance. Therefore, the vehicle is equipped with a contamination detection device configured to detect contamination of these sensors, and a sensor cleaning system configured to clean the sensors when sensing parts are contaminated.

The above information disclosed in this Background section is only to enhance understanding of the background of the present disclosure and therefore it may contain information that does not form the prior art that is already known to a person of ordinary skill in the art.

SUMMARY OF THE DISCLOSURE

An object of the present disclosure is to provide a foreign substance detection system capable of reducing consumption of electric power required to detect contamination of an environmental sensor of a vehicle.

The object of the present disclosure is not limited to the above-mentioned object, and other objects, which are not mentioned above, may be clearly understood from the following descriptions by those with ordinary skill in the art (hereinafter, referred to as 'those skilled in the art') to which the present disclosure pertains.

The features of the present disclosure for achieving the above-mentioned objects of the present disclosure and carrying out the characteristic function of the present disclosure to be described below are as follows.

In one aspect of the present disclosure, a foreign substance detection system includes a detection loop through which current selectively flows. In one embodiment, the detection loop includes a controller configured to operatively control a sensor cleaning system configured to clean an environmental sensor of a vehicle, a power supply unit configured to continuously supply electric power to the controller. The environmental sensor includes a detection device configured to open or close the detection loop on the basis of whether a fluid or a foreign substance is attached.

The present disclosure provides the foreign substance detection system capable of reducing the consumption of electric power required to detect contamination of the environmental sensor of the vehicle.

The effects of the present disclosure are not limited to the above-mentioned effects, and the other effects, which are not mentioned above, will be clearly understood by those having ordinary skill in the art from the following description.

Other aspects and embodiments of the present disclosure are discussed infra.

It is understood that the term "vehicle" or "vehicular" or other similar term as used herein is inclusive of motor vehicles in general such as passenger automobiles including sports utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the present disclosure are discussed infra.

BRIEF DESCRIPTION OF THE DRAWINGS

The above and other features of the present disclosure are now described in detail with reference to certain embodiments thereof illustrated in the accompanying drawings which are given hereinbelow by way of illustration only, and thus are not limitative of the present disclosure, and wherein:

FIG. 8 is a view illustrating an operation flow of the foreign substance detection system according to an embodiment of the present disclosure.

Figure 1:
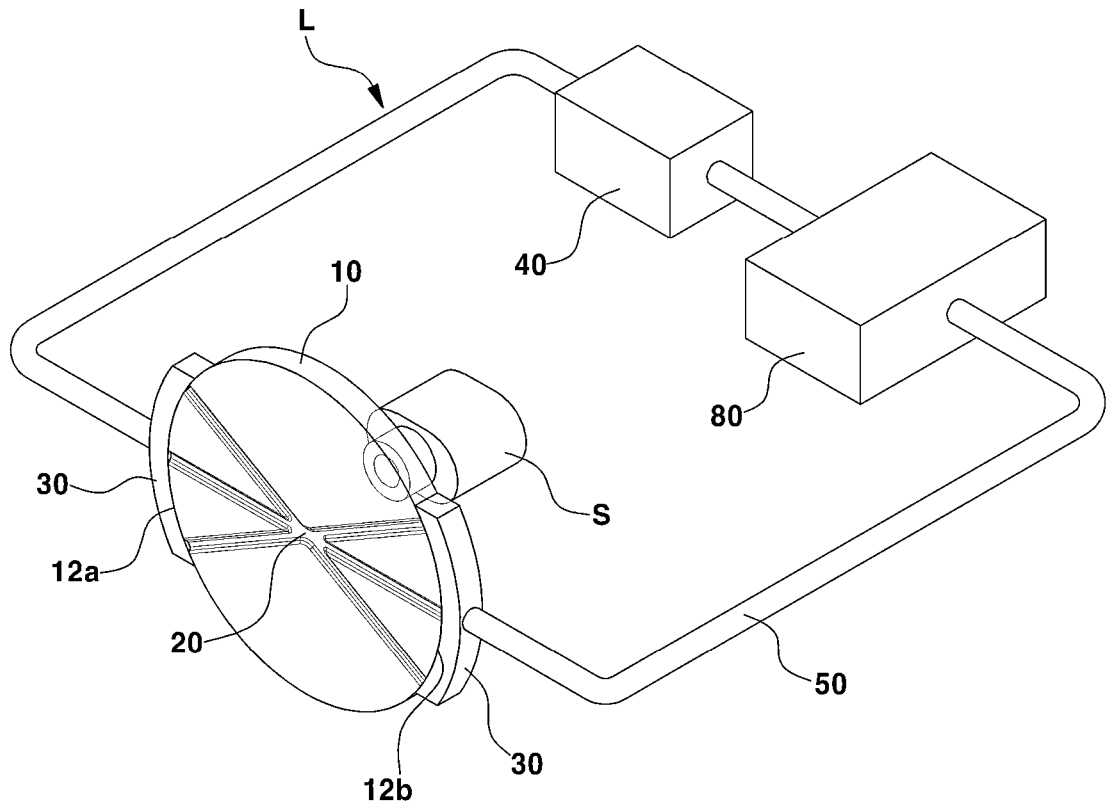
FIG. 1 is a configuration view of a foreign substance detection system according to an embodiment of the present disclosure.
Figure 2A:
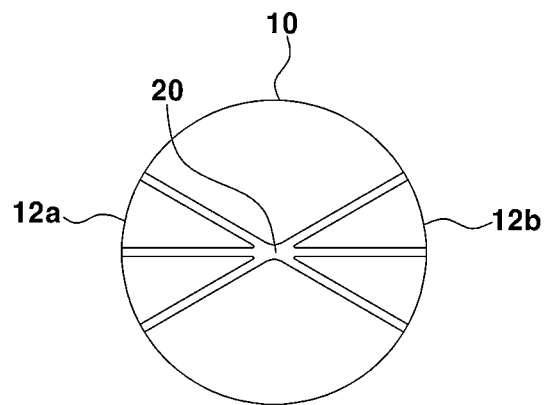
FIGS. 2A to 2E are views illustrating covers for a detection device according to various embodiments of the present disclosure.
Figure 2B:
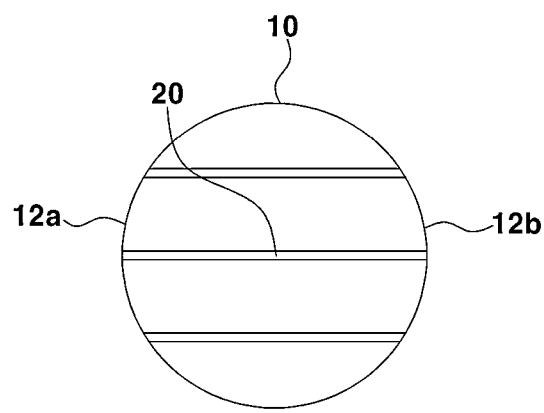
Figure 2C:
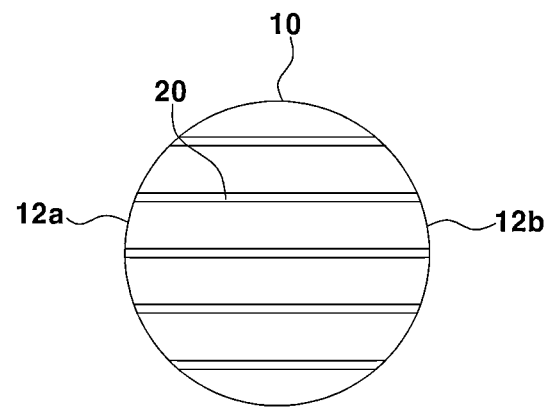
Figure 2D:
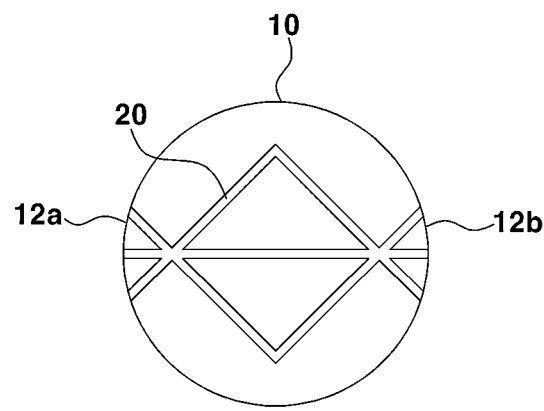
Figure 2E:
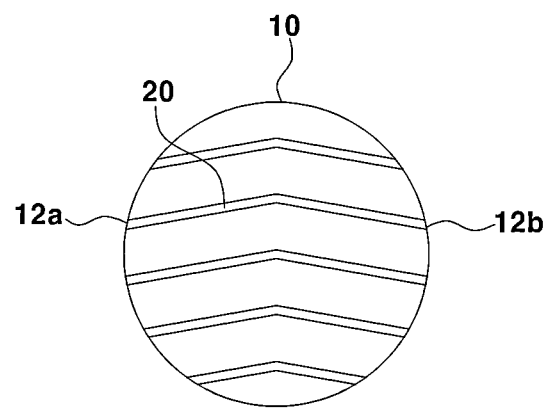

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes should be determined in part by the particular intended application and use environment.

In the figures, reference numbers refer to the same or equivalent parts of the present disclosure throughout the several figures of the drawing.

DETAILED DESCRIPTION

Hereinafter reference is now made in detail to various embodiments of the present disclosure, examples of which are illustrated in the accompanying drawings and described below. While the present disclosure is described in conjunction with exemplary embodiments, it should be understood that present description is not intended to limit the present disclosure to those embodiments. On the contrary, the present disclosure is intended to cover not only the embodiments, but also various alternatives, modifications, equivalents and other embodiments, which may be included within the spirit and scope of the present disclosure.

Specific structural and functional descriptions suggested in embodiments of the present disclosure are described below only to explain the concept of the present disclosure, and the embodiments according to the concept of the present disclosure may be carried out in various forms. In addition, the present disclosure should not be interpreted as being limited to the embodiments disclosed in the present disclosure, and it should be understood that the present disclosure includes all modifications, equivalents, and alternatives included in the spirit and the technical scope of the present disclosure.

Meanwhile, the terms, such as "first" and/or "second" in the present disclosure may be used to describe various constituent elements, but these constituent elements should not be limited by these terms. These terms are used only for the purpose of distinguishing one constituent element from other constituent elements. For example, without departing from the scope according to the concept of the present disclosure, a first constituent element may be referred to as a second constituent element, and similarly, the second constituent element may also be referred to as the first constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, that is, "between" and "just between" or "adjacent to" and "directly adjacent to," for explaining a relationship between constituent elements, should be interpreted in a similar manner.

When a component, device, element, or the like of the present disclosure is described as having a purpose or performing an operation, function, or the like, the component, device, or element should be considered herein as being "configured to" meet that purpose or to perform that operation or function.

Like reference numerals indicate like constituent elements throughout the specification. Meanwhile, the terms used in the present specification are for explaining the embodiments, not for limiting the present disclosure. Unless particularly stated otherwise in the present specification, a singular form also includes a plural form. The terms "comprise (include)" and/or "comprising (including)" used in the specification are intended to specify the presence of the mentioned constituent elements, steps, operations, and/or elements, but do not exclude presence or addition of one or more other constituent elements, steps, operations, and/or elements.

Hereinafter, the present disclosure is described in detail with reference to the accompanying drawings.

As described above, various types of environmental sensors capable of detecting surrounding environments are mounted in autonomous vehicles, vehicles equipped with driver assistance systems, and the like. As a non-restrictive example, the environmental sensors include a lidar, a radar, a camera, and the like, and the environmental sensors may be disposed on a front side, a rear side, a lateral side, or a roof of the vehicle.

The vehicle is mainly located outdoors and placed in a traveling situation. For this reason, the environmental sensors mounted outside the vehicle may be contaminated by foreign substances, such as raindrops, dust, and insects. Therefore, the vehicle has a sensor cleaning system capable of cleaning the contaminated environmental sensor. The environmental sensor may be cleaned by using a washer fluid or spraying high-pressure compressed air. The sensor cleaning using the compressed air is mainly used to remove liquid foreign substances, such as raindrops, or remove a washer fluid applied first during the process of removing foreign substances.

Among other things, a process of detecting whether foreign substances are attached to the environmental sensor needs to be performed in advance to implement effective cleaning. For example, the detection of the attachment of foreign substances may be performed through camera vision. This method is intuitive and reliable, but the vision check needs to be periodically performed, consistently consuming electric power.

Therefore, the present disclosure provides a detection device capable of detecting the attachment of foreign substances without consistent electric power consumption at the moment when the foreign substances are attached to the environmental sensor.

In particular, the detection device is configured such that electricity does not flow during a normal operation, and electricity flows and a signal is transmitted at the moment when a foreign substance is attached to the environmental sensor on the basis of capillarity of a liquid.

As illustrated in FIG. 1, a detection device according to an embodiment of the present disclosure includes a cover 10. The cover 10 is disposed to protect an environmental sensor S. The cover 10 may be disposed to at least protect a sensing part of the environmental sensor S. In an embodiment, the cover 10 may be included in the environmental sensor S. In another embodiment, the cover 10 may be disposed separately from the environmental sensor S.

The cover 10 may be made of an insulator. As a non-restrictive example, the cover 10 may be made of plastic, glass, or the like. The material of the cover 10 is not limited only to plastic or glass, and the cover 10 may be made of any material as long as the material is an insulator. In addition, the cover 10 may be made of a transparent material.

In one embodiment, at least one flow path 20 is provided on a surface of the cover 10. The flow path 20 may be recessed from the surface of the cover 10. The flow path 20 extends from a first contact portion 12a, which is one side of the cover 10, to a second contact portion 12b, which is the other side of the cover 10, while traversing the cover 10. For example, the first contact portion 12a, which is one side of the cover 10, may be an approximately left peripheral portion based on a vertical centerline of the cover 10, and the second contact portion 12b may be an approximately right peripheral portion based on the vertical centerline.

In another embodiment, a plurality of flow paths 20 may be formed in the cover 10. In other words, the flow path 20 may be divided into multiple flow paths to improve an ability of detecting foreign substances or fluid. The plurality of flow paths 20 may communicate with one another. In another form, the plurality of flow paths 20 may be provided independently of one another without communicating with one another. In addition, some of the plurality of flow paths 20 may communicate with one another, and the others may be provided independently of one another without communicating with one another.

Referring to FIGS. 2A to 2E, the flow paths 20 according to various embodiments of the present disclosure may have various shapes. The flow path 20 may have various shapes as long as the flow path 20 extends from the first contact portion 12a to the second contact portion 12b of the cover 10. However, the flow path 20 may have a straight shape instead of a crooked shape.

In addition, the flow path 20 may be as narrow as possible. As the capillarity may occur well when the flow path 20 is narrow, the flow path 20 may be as narrow as possible. However, a thickness of the flow path 20 may be determined in consideration of an operation level of a sensor cleaning system 100. This is based on the fact that it is difficult for the sensor cleaning system 100 to remove foreign substances in the flow path 20 when the flow path 20 is too narrow.

Figure 3:
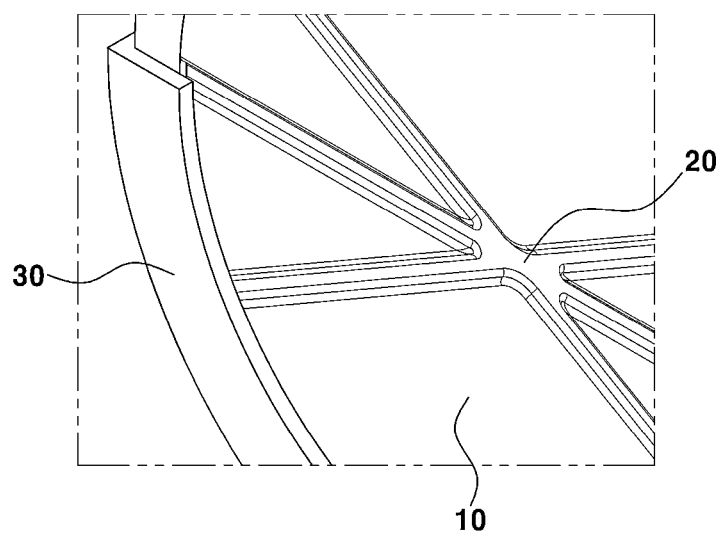
FIG. 3 is a view illustrating a flow path of the detection device according to an embodiment of the present disclosure.

As illustrated in FIG. 3, an edge of the flow path 20 may be gently formed. For example, the edge of the flow path 20 may be filleted. Particularly, this is to minimize interference applied to environmental sensor S by a shadow.

Referring back to FIG. 1, electric conductors 30 are coupled to the cover 10. The electric conductors 30 may be respectively coupled to two opposite sides of the cover 10 so that the electric conductors 30 are in contact with the flow path 20. In an embodiment, the electric conductors 30 may be respectively coupled to the first contact portion 12a and the second contact portion 12b of the cover 10.

As may be known from the name of the electric conductor 30, the electric conductor 30 is made of a conductive material. In other words, the electric conductor 30 may be made of any material as long as the material may transmit electricity.

Figure 4:
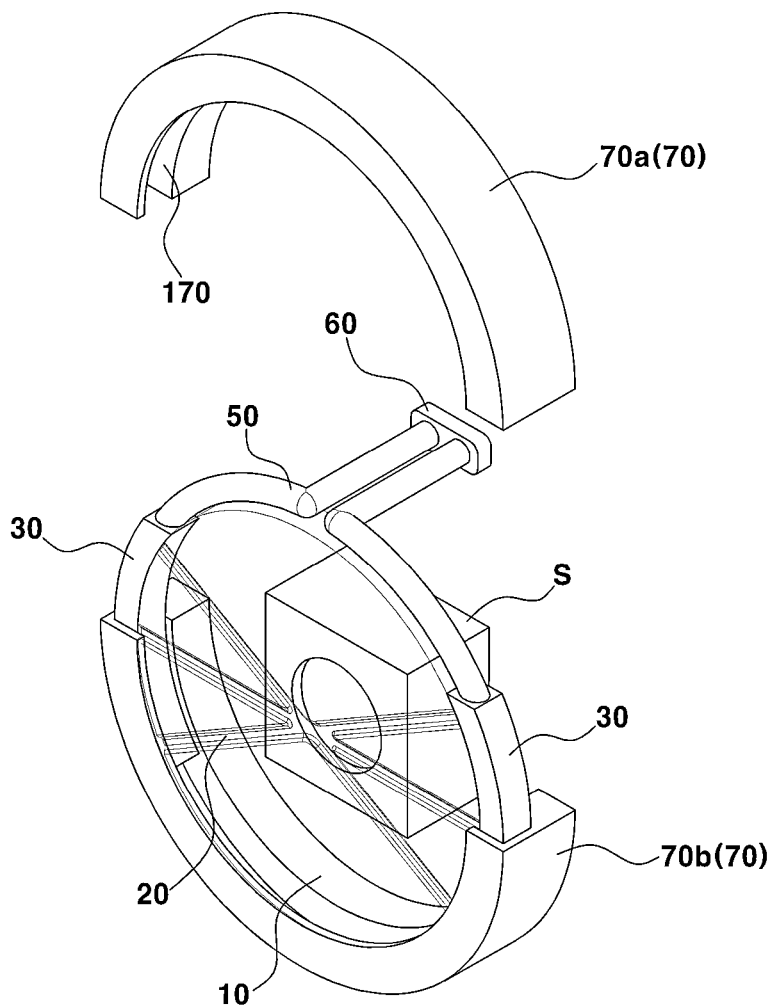
FIG. 4 is a view illustrating the detection device according to an embodiment of the present disclosure.

The electric conductors 30 are connected to a controller 40. In one embodiment, cables 50 are respectively coupled to the electric conductors 30, and the cables 50 are connected to the controller 40. Referring to FIG. 4, in an embodiment, a connector 60 may be provided to connect the cables 50.

The cables 50 and the electric conductors 30 may be connected in various ways. As a non-restrictive example, the cable 50 and the electric conductor 30 may be connected to each other by bolting. As another non-restrictive example, the cable 50 and the electric conductor 30 may be connected to each other by soldering.

The detection device according to the present disclosure may further include a casing 70. In an embodiment, the casing 70 includes an upper casing 70a and a lower casing 70b. In an embodiment, the upper casing 70a and the lower casing 70b may be integrated with each other.

The casing 70 may be disposed to surround the cover 10. For example, the casing 70 may have an annular shape. The cover 10 and the electric conductors 30 may be disposed inside the casing 70 so that the casing 70 accommodates the cover 10 and the electric conductor 30. In an embodiment, the casing 70 has a recess 170. The recess 170 may be recessed from an inner surface of the casing 70 with a predetermined depth. In an embodiment, the recess 170 may be provided in at least a part of the periphery of the upper casing 70a and formed along the inner surface of the upper casing 70a, and the recess 170 may be provided in at least a part of the periphery of the lower casing 70b and formed along the inner surface of the lower casing 70b.

The electric conductors 30 may be seated in the recesses 170 of the upper and lower casings 70a and 70b. The cover 10 may be disposed inside the electric conductors 30. Further, the cables 50 may be accommodated in the recess 170 of the upper casing 70a or the recess 170 of the lower casing 70b.

Referring back to FIG. 1, the controller 40 may be a controller that operates the sensor cleaning system 100 of the vehicle. In another embodiment, the controller 40 may be a separate controller configured to communicate with the sensor cleaning system 100 of the vehicle.

The controller 40 is connected to a power supply unit 80. The controller 40 is configured to be supplied with power from the power supply unit 80 at normal times. As a non-restrictive example, the power supply unit 80 may be a battery generally included in the vehicle.

Figure 5:
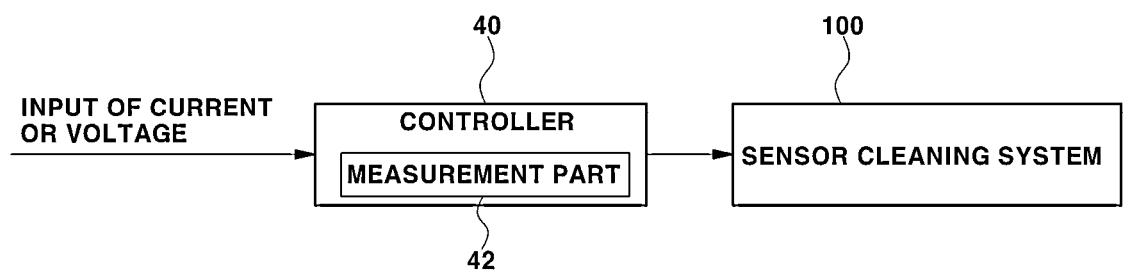
FIG. 5 is a view schematically illustrating an operation flow of the foreign substance detection system according to an embodiment of the present disclosure.

As illustrated in FIG. 5, according to an embodiment of the present disclosure, the controller 40 includes a measurement part 42. The measurement part 42 is configured to measure current or voltage inputted to the controller 40. The controller 40 may determine whether to operate the sensor cleaning system 100 on the basis of the current or voltage measured by the measurement part 42. For example, the controller 40 may adjust the operating time of the sensor cleaning system 100 on the basis of the measured current or voltage.

Figure 6:
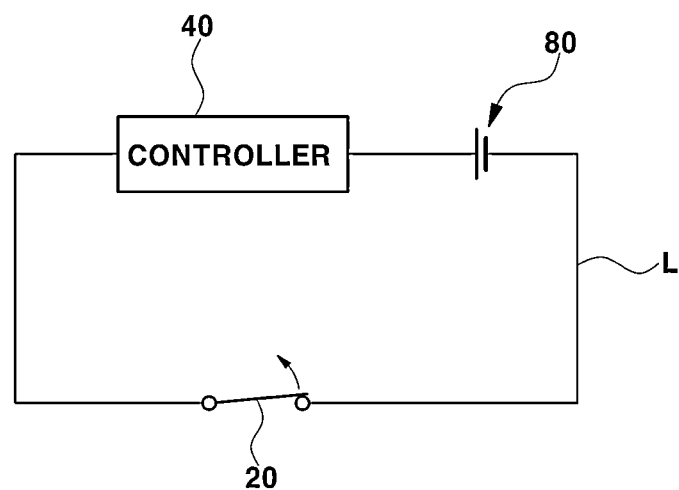
FIG. 6 is a view schematically illustrating a detection loop of the foreign substance detection system according to an embodiment of the present disclosure.

As illustrated in FIG. 6, the detection device may serve as a switch and detect whether foreign substances are attached to the cover 10 configured to protect the environmental sensor S. In particular, the present disclosure may detect the attachment of foreign substances by using capillarity of a liquid. The capillarity refers to a phenomenon in which when a capillary is inputted in a liquid, a liquid surface in the capillary becomes higher or lower than a liquid surface outside the capillary. Alternatively, the capillarity may refer to a phenomenon in which a liquid in a capillary is raised or lowered by an attractive force between liquid molecules and an attractive force between the liquid molecule and the wall of the capillary.

Figure 7:
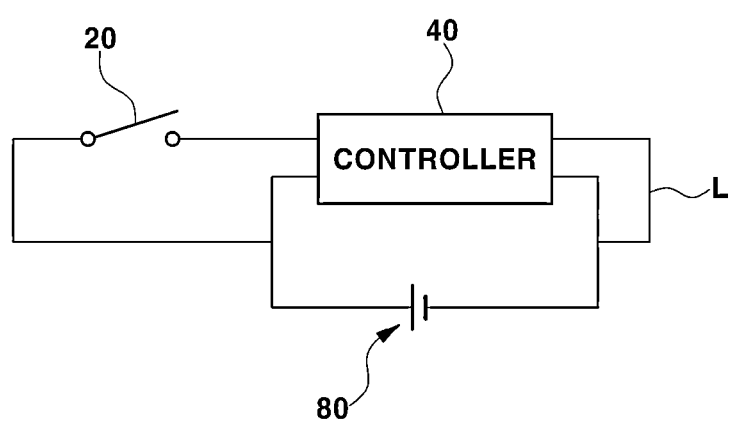
FIG. 7 is a view schematically illustrating the detection loop of the foreign substance detection system according to an embodiment of the present disclosure.

According to the present disclosure, when the cover 10 is not contaminated, i.e., when foreign substances, such as raindrops, are not attached to the cover 10, electricity does not flow through a detection loop L, and the detection loop L is in an open circuit state since the cover 10 is made of an insulator. However, as illustrated in FIG. 7, the controller 40 and the power supply unit 80 are configured to define a closed circuit in the detection loop L, such that electric power may be supplied to the controller 40 constantly. When the cover 10 is contaminated by a fluid or foreign substances, the flow path 20 is filled with the fluid or the foreign substances according to the capillarity. As the flow path 20 is filled with the fluid, the electric conductors 30 are connected, and electricity flows through the detection loop L. That is, the detection loop L becomes a closed circuit.

When electricity flows through the detection loop L, the controller 40 may receive an electric conduction signal and recognize the electric conduction signal as a signal for operating the sensor cleaning system 100, thereby operating the sensor cleaning system 100.

In addition, the controller 40 may determine the operating time of the sensor cleaning system 100 on the basis of the measured current or voltage. The cover 10 may have the plurality of flow paths 20, and the number of flow paths 20 connected to one another varies depending on the amount of foreign substances attached to the cover 10. That is, the flow paths 20 serve as variable resistors. The voltage or current detected by the controller 40 varies depending on changes in resistance. Therefore, the controller 40 may increase sensor cleaning intensity in proportion to the detected voltage or current. Further, the sensor cleaning intensity may be implemented by adjusting the operating time of the sensor cleaning system. Of course, the operating time for each level of the current or voltage may be set in advance through evaluations and tests.

An operation flow of the detection device according to an embodiment of the present disclosure is described below with reference to FIG. 7.

In step S10, the detection device according to the present disclosure begins to operate.

In step S12, when foreign substances, such as raindrops, are attached to the cover 10, the raindrops in the flow path 20 connect the two electric conductors 30 and close the detection loop L according to the capillarity.

When the detection loop L becomes the closed circuit, the current or voltage is inputted to the controller 40 (S14). The controller 40 recognizes the inputted current or voltage as a signal for operating the sensor cleaning system 100 and operates the sensor cleaning system 100, thereby cleaning the environmental sensor S.

Meanwhile, in this case, the measurement part 42 of the controller 40 measures a magnitude of the inputted current or voltage (S16). The number of flow paths 20, which are connected to one another among the plurality of flow paths 20, varies depending on the amount of foreign substances attached to the cover 10, and thus the magnitude of the current or voltage inputted to the controller 40 varies. The controller 40 stores the preset operating time of the sensor cleaning system 100 for each of the magnitudes of the measured current or voltage. The controller 40 determines the operating time of the sensor cleaning system 100 on the basis of the stored information (S18).

When the operating time is determined, the controller 40 operates the sensor cleaning system 100 for the determined operating time, thereby removing the foreign substances on the cover 10 and ensuring the performance of the environmental sensor S (S20).

After the sensor cleaning system 100 operates, the controller 40 controls the measurement part 42 to measure the magnitude of the current or voltage again (S22). The controller 40 may check the magnitude of the current or voltage again, thereby determining whether the foreign substances are removed by the previous cleaning process. When the checked magnitude of the current or voltage is larger than zero (0), the controller 40 allows the process to go back to step S16 and performs the subsequent steps. In contrast, when the checked magnitude of the current or voltage is zero (0), the controller 40 ends the operational process (S24).

According to the present disclosure, based on the fact that most contaminants, which may be attached to the environmental sensor such as an image sensor disposed outside the vehicle, contain fluids, the electric circuit is configured such that a flow of current through the foreign substances may be controlled, and the controller recognizes the contamination when electricity flows. The contamination level of the sensor is proportional to the amount of fluid in the flow path 20 of the cover 10. Therefore, the magnitude of the current or voltage flowing in the detection loop L increases as the contamination level becomes severe. Therefore, the controller 40 increases the operating time of the sensor cleaning system as the magnitude of the inputted current or voltage increases.

According to the present disclosure, the sensor configured to detect the contamination of the environmental sensor does not consistently operate, but the sensor may operate only when foreign substances containing fluids are attached, thereby reducing electric power consumption of the vehicle. A method of measuring a degree of contamination of a sensor by using a system in the related art includes capturing images and analyzing the captured images, which is complex and requires consistent electric power consumption. In contrast, according to the present disclosure, the sensor may simply operate only when the current or voltage is generated.

The present disclosure, which has been described above, is not limited by the aforementioned embodiment and the accompanying drawings, and it should be obvious to those having ordinary skill in the art to which the present disclosure pertains that various substitutions, modifications and alterations may be made without departing from the technical spirit of the present disclosure.

The present disclosure has been described in detail with reference to embodiments thereof. However, it should be appreciated by those having ordinary skill in the art that changes may be made to these embodiments without departing from the principles and spirit of the present disclosure.

What is claimed is:

1. A foreign substance detection system comprising:
    a detection loop through which current selectively flows, wherein the detection loop comprises:
        a controller configured to operatively control a sensor cleaning system configured to clean an environmental sensor of a vehicle; and
        a power supply unit configured to continuously supply electric power to the controller,
    wherein the environmental sensor comprises a detection device configured to open or close the detection loop based on whether a fluid or a foreign substance is attached to the environmental sensor,
    wherein the detection device comprises:
        a cover comprising at least one flow path recessed from a surface of the cover; and
        electric conductors respectively disposed at two opposite sides of the cover so that the electric conductors are in contact with the at least one flow path of the cover, and
    wherein an edge of the at least one flow path is filleted.

2. The foreign substance detection system of claim 1, wherein when the fluid or the foreign substance comes into contact with the environmental sensor, the detection device is configured to close the detection loop and to transmit a signal to the controller so that the controller operates the sensor cleaning system.

3. The foreign substance detection system of claim 1, wherein the detection device is integrated with the environmental sensor.

4. The foreign substance detection system of claim 1, wherein the detection device is provided separately from the environmental sensor.

5. The foreign substance detection system of claim 1, wherein the detection device further comprises a casing having a recess configured to accommodate the cover and the electric conductors.

6. The foreign substance detection system of claim 2, wherein the signal is a current or voltage signal generated when the detection loop is closed.

7. The foreign substance detection system of claim 1, wherein when the fluid or the foreign substance is attached to the cover and the detection loop is closed, the controller is configured to receive current or voltage and to determine an operating time of the sensor cleaning system based on a magnitude of the inputted current or voltage.

8. The foreign substance detection system of claim 7, wherein the controller operates the sensor cleaning system for the determined operating time.

9. The foreign substance detection system of claim 7, wherein the at least one flow path includes a plurality of flow paths, and the magnitude of the inputted current or voltage increases in proportion to a number of the plurality of flow paths into which the fluid or the foreign substance is introduced.

10. The foreign substance detection system of claim 8, wherein after the sensor cleaning system operates, the controller is configured to determine whether the current or voltage inputted to the controller is zero (0).

11. The foreign substance detection system of claim 10, wherein when the inputted current or voltage is not 0, the controller is configured to operate the sensor cleaning system again.

12. The foreign substance detection system of claim 10, wherein when the inputted current or voltage is not 0, the controller is configured to determine the operating time of the sensor cleaning system based on the magnitude of the inputted current or voltage.

13. A foreign substance detection system comprising:
a detection loop through which current selectively flows, wherein the detection loop comprises:
    a controller configured to operatively control a sensor cleaning system configured to clean an environmental sensor of a vehicle; and
    a power supply unit configured to continuously supply electric power to the controller,
wherein the environmental sensor comprises a detection device configured to open or close the detection loop based on whether a fluid or a foreign substance is attached to the environmental sensor, and
wherein the detection device comprises:
    a cover comprising at least one flow path recessed from a surface of the cover;
    electric conductors respectively disposed at two opposite sides of the cover so that the electric conductors are in contact with the at least one flow path of the cover; and
    a casing having a recess configured to accommodate the cover and the electric conductors.

14. A foreign substance detection system comprising:
a detection loop through which current selectively flows, wherein the detection loop comprises:
    a controller configured to operatively control a sensor cleaning system configured to clean an environmental sensor of a vehicle; and
    a power supply unit configured to continuously supply electric power to the controller,
wherein the environmental sensor comprises a detection device configured to open or close the detection loop based on whether a fluid or a foreign substance is attached to the environmental sensor,
wherein the detection device comprises:
    a cover comprising at least one flow path recessed from a surface of the cover; and
    electric conductors respectively disposed at two opposite sides of the cover so that the electric conductors are in contact with the at least one flow path of the cover, and
wherein when the fluid or the foreign substance is attached to the cover and the detection loop is closed, the controller is configured to receive current or voltage and to determine an operating time of the sensor cleaning system based on a magnitude of the inputted current or voltage.

15. The foreign substance detection system of claim 14, wherein the environment sensor is configured to be cleaned for the determined operating time.

16. The foreign substance detection system of claim 14, wherein the at least one flow path includes a plurality of flow paths, and the magnitude of the inputted current or voltage increases in proportion to a number of the plurality of flow paths into which the fluid or the foreign substance is introduced.

17. The foreign substance detection system of claim 16, wherein after the environment sensor is cleaned, the controller is configured to determine whether the current or voltage inputted to the controller is zero (0).

18. The foreign substance detection system of claim 17, wherein when the inputted current or voltage is not 0, the environment sensor is configured to be cleaned again.

* * * * *